United States Patent
Okunaka et al.

(10) Patent No.: US 9,427,791 B2
(45) Date of Patent: Aug. 30, 2016

(54) PANEL ASSEMBLY AND METHOD OF FORMING SAME

(71) Applicant: HONDA MOTOR CO., LTD., Tokyo (JP)

(72) Inventors: Keishi Okunaka, Tochigi (JP); Sen Tao, Tochigi (JP); Kenji Shiobara, Tochigi (JP); Kota Kobayashi, Tochigi (JP); Keizo Yamashita, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 90 days.

(21) Appl. No.: 14/321,970

(22) Filed: Jul. 2, 2014

(65) Prior Publication Data

US 2015/0016872 A1    Jan. 15, 2015

(30) Foreign Application Priority Data

Jul. 8, 2013  (JP) ................................. 2013-142241

(51) Int. Cl.
| | |
|---|---|
| *F16D 1/072* | (2006.01) |
| *B21D 39/02* | (2006.01) |
| *B21D 19/12* | (2006.01) |
| *B60J 5/04* | (2006.01) |
| *F16B 5/00* | (2006.01) |

(52) U.S. Cl.
CPC ............. *B21D 39/021* (2013.01); *B21D 19/12* (2013.01); *B21D 39/026* (2013.01); *B60J 5/0469* (2013.01); *F16B 5/0096* (2013.01); *Y10T 403/4966* (2015.01)

(58) Field of Classification Search
CPC ...... B21D 5/16; B21D 53/88; B21D 39/021; B21D 39/023; B21D 39/02; B21D 19/12; B21D 39/026; Y10T 403/4966; F16B 5/0096; B60J 5/0469
USPC .............. 403/206, 209, 280–283; 29/243.57, 29/243.58; 296/29, 191
See application file for complete search history.

(56) References Cited

U.S. PATENT DOCUMENTS

| | | | | |
|---|---|---|---|---|
| 1,539,519 | A * | 5/1925 | Shank ............................. | 211/24 |
| 2,255,658 | A * | 9/1941 | Friedman ....................... | 228/155 |
| 2,643,627 | A * | 6/1953 | Wobbe ............................. | 413/6 |
| 3,244,131 | A * | 4/1966 | Heinle ............................ | 413/12 |

(Continued)

FOREIGN PATENT DOCUMENTS

| | | |
|---|---|---|
| CN | 2417260 | 1/2001 |
| JP | 2008-105083 | 5/2008 |

OTHER PUBLICATIONS

Chinese Office Action with English translation dated Nov. 4, 2015, 16 pages.

*Primary Examiner* — Daniel P Stodola
*Assistant Examiner* — Nahid Amiri
(74) *Attorney, Agent, or Firm* — Rankin, Hill & Clark LLP (57) ABSTRACT

A panel assembly includes an outer member and an inner member, which overlap each other and jointly have an edge that includes a distal end portion of the outer member and a distal end portion projecting from an end of the inner member. The distal end portions are fastened together by sheet metal seaming. Boundary regions of the inner member between the distal end portion, which is seamed, and the end, which is not seamed, have respective clearances defined in the end, and which are spaced away from a seaming range in which the distal end portions are seamed.

4 Claims, 10 Drawing Sheets

(56) References Cited

U.S. PATENT DOCUMENTS

| | | | |
|---|---|---|---|
| 3,361,291 A * | 1/1968 | Fraze | 220/273 |
| 4,010,703 A * | 3/1977 | Spiekermann et al. | 413/21 |
| 4,315,175 A * | 2/1982 | Hamilton | H01R 4/029 174/90 |
| 4,563,559 A * | 1/1986 | Enami | 219/756 |
| 4,747,722 A * | 5/1988 | Kawaguchi | C04B 37/026 403/272 |
| 5,423,156 A * | 6/1995 | Nellessen, Jr. | E04B 2/707 403/232.1 |
| 5,730,545 A * | 3/1998 | Klemmer et al. | 403/373 |
| 6,622,449 B2 * | 9/2003 | Smith et al. | 52/656.9 |
| 7,478,469 B2 * | 1/2009 | Yong | 29/514 |
| 7,846,555 B2 * | 12/2010 | Tao et al. | 428/583 |
| 2001/0049314 A1 * | 12/2001 | Suzuki | 474/248 |
| 2013/0154286 A1 * | 6/2013 | Tamada | B60R 21/04 293/133 |

\* cited by examiner

PANEL ASSEMBLY AND METHOD OF FORMING SAME

CROSS-REFERENCE TO RELATED APPLICATION

This application is based upon and claims the benefit of priority from Japanese Patent Application No. 2013-142241 filed on Jul. 8, 2013, the contents of which are incorporated herein by reference.

BACKGROUND OF THE INVENTION

1. Field of the Invention

The present invention relates to a panel assembly made up of an outer member and an inner member, which overlap each other and jointly have an edge that includes a distal end portion of the outer member and a distal end portion projecting from an end of the inner member, the distal end portions being fastened together by sheet metal seaming. The present invention also relates to a method of forming such a panel assembly.

2. Description of the Related Art

Heretofore, in the automobile industry, panel assemblies, which are made up of an outer panel (outer member) and an inner panel (inner member) that overlap each other and have respective edges fastened together, have widely been used as engine hoods, trunk lids, doors, etc.

Certain panel assemblies of the type described above may be of a three-dimensional shape having different curvatures on the edges thereof, or may be made up of panels having portions of different rigidities, shapes, and other qualities. A panel assembly has been proposed having edges of excellent appearance, and which is made up of members fastened together with high strength (see Japanese Laid-Open Patent Publication No. 2008-105083).

The proposed panel assembly has a seamed edge having a first shape and a second shape. The first shape is a seamed shape in which an end of a first panel member is included in a second panel member, and an end of the second panel member is included in the first panel member. The second shape is a seamed shape in which an end of the second panel member is included in the first panel member, but an end of the first panel member is not included in the second panel member.

Figure 10:
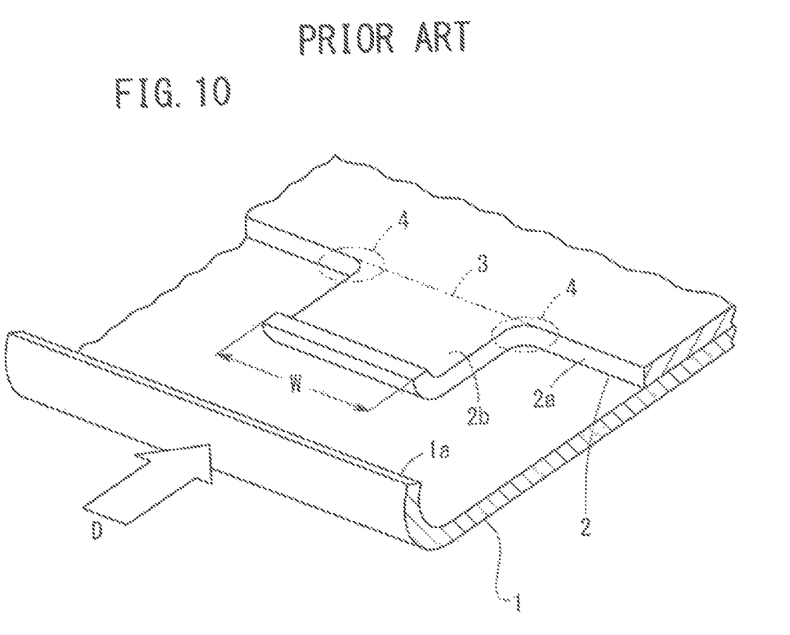
FIG. 10 is a fragmentary perspective view showing an outer panel and an inner panel, which are curled and seamed according to the related art.

As shown in FIG. 10 of the accompanying drawings, one panel assembly is made up of an outer panel 1 and an inner panel 2. The outer panel 1 and the inner panel 2 are fastened together by sheet metal seaming. The inner panel 2 has a distal end portion 2b that projects from an end 2a thereof toward a distal end portion 1a of the outer panel 1.

The inner panel 2 overlaps and is spaced inwardly from the outer panel 1. In order to fasten the outer panel 1 and the inner panel 2, the distal end portion 1a of the outer panel 1 is curled initially in the forming direction D toward the inner panel 2. As the distal end portion 1a is curled, the distal end portion 1a encloses the distal end portion 2b of the inner panel 2 and is continuously curled up to an end line 3.

The distal end portion 2b of the inner panel 2 has a forming width W that increases at boundary regions 4 between the distal end portion 2b and the end 2a. Therefore, when a curling punch is used to curl the distal end portions 1a, 2b, the curling punch is subjected to excessive resistance (resistive load per unit width×forming width) at the boundary regions 4. As a result, the resultant seamed edge is likely to have a poor appearance due to scratches, dents, and other damage caused by improper biting engagement with the curling punch.

SUMMARY OF THE INVENTION

It is an object of the present invention to provide a panel assembly, as well as a method of forming such a panel assembly, which is capable of reducing the resistance that a curling punch is subjected to when the curling punch is used to form the panel assembly, whereby the panel assembly exhibits an improved appearance.

According to the present invention, there is provided a panel assembly comprising an outer member and an inner member, which overlap each other and jointly have an edge that includes a distal end portion of the outer member and a distal end portion projecting from an end of the inner member, the distal end portions being fastened together by sheet metal seaming.

Boundary regions between the distal end portion, which is seamed, and the end, which is not seamed, have respective clearances defined in the end, and which are spaced away from a seaming range in which the distal end portions are seamed.

According to the present invention, there also is provided a method of forming a panel assembly having an outer member and an inner member, which overlap each other and jointly have an edge that includes a distal end portion of the outer member and a distal end portion projecting from an end of the inner member, the distal end portions being fastened together by sheet metal seaming. The method comprises the steps of forming, in boundary regions between the distal end portion, which is seamed, and the end, which is not seamed, respective clearances defined in the end, and which are spaced away from a seaming range in which the distal end portions are seamed, placing the inner member and the outer member in overlapping relation to each other while the distal end portion of the inner member is spaced inwardly from the distal end portion of the outer member, curling the distal end portion of the outer member and the distal end portion of the inner member, and fastening the distal end portion of the outer member and the distal end portion of the inner member together by way of sheet metal seaming.

As described above, the boundary regions between the distal end portion and the end of the inner member have the respective clearances, which are defined in the end and spaced away from the seaming range. When a curling punch curls the distal end portion of the outer panel, thereby causing the distal end portion to include and curl the distal end portion of the inner panel, the resistance that the curling punch is subjected to during the curling action is not increased. Consequently, with a simple structure and process, the load imposed on the curling punch when the curling punch curls the inner panel can effectively be reduced. Thus, the edges are prevented from being subjected to improper biting engagement with the curling punch, and the edges have a neat appearance.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
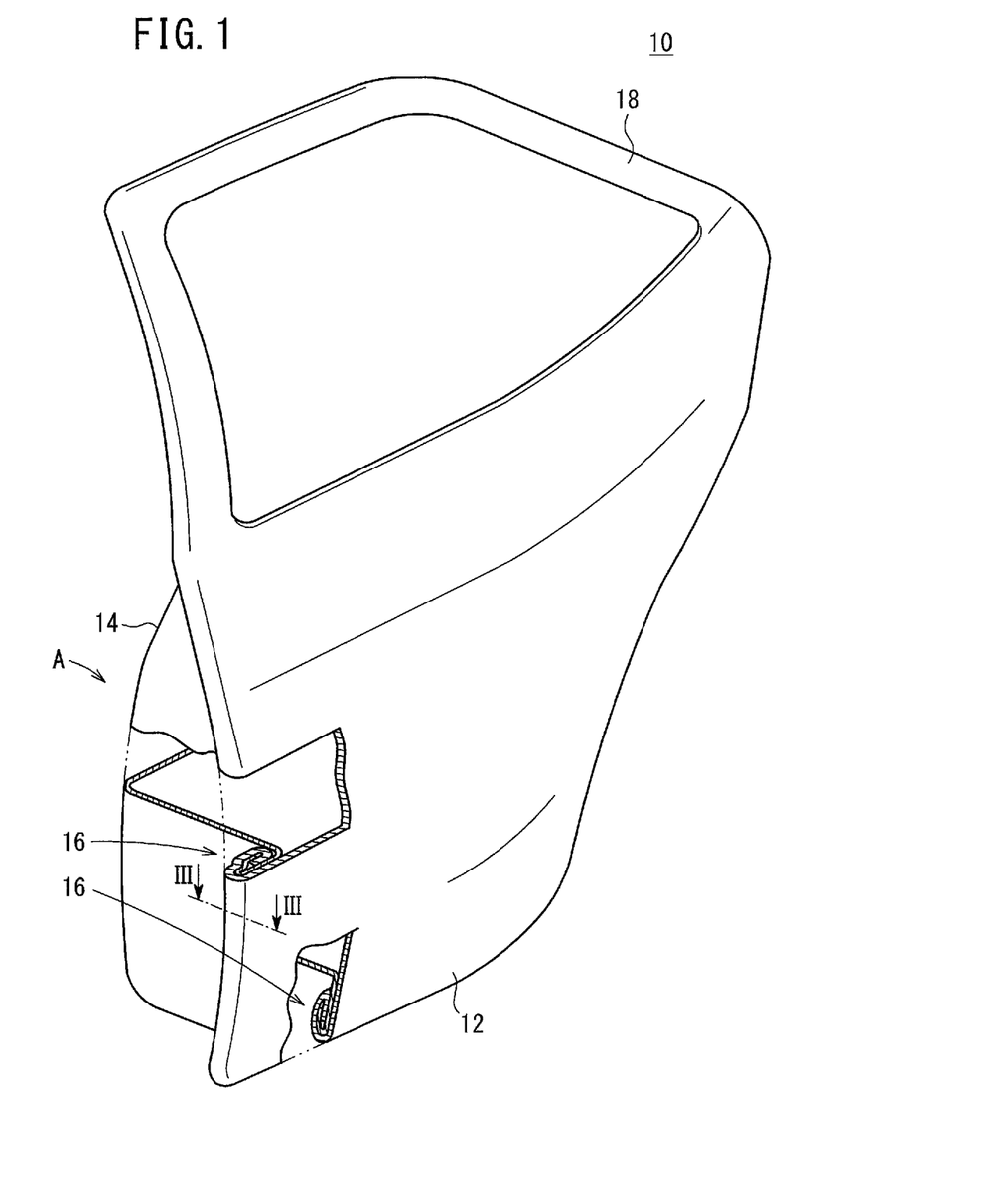
FIG. 1 is a perspective view, partially cut away, of a panel assembly according to an embodiment of the present invention.

As shown in FIG. 1, a panel assembly 10 according to an embodiment of the present invention is constructed as a rear door of an automobile, for example. Although not shown, the panel assembly 10 may be constructed as another automobile component, such as an engine hood, a trunk lid, a front door, or the like.

The panel assembly 10 is made up of an outer panel (outer member) 12 and an inner panel (inner member) 14, which overlap each other. The panel assembly 10 has edges 16, each of which includes seamed edges of the outer panel 12 and the inner panel 14. The edges 16 of the panel assembly 10 extend three-dimensionally within desired ranges of the automobile rear door.

In the panel assembly 10, the inner panel 14, for example, serves as a window frame 18 of the automobile rear door. The inner panel 14 is made of an iron-based material, for example. The outer panel 12 is made of an aluminum alloy, for example. Each of the outer panel 12 and the inner panel 14 is a metal sheet punched out in a desired shape.

Figure 2:
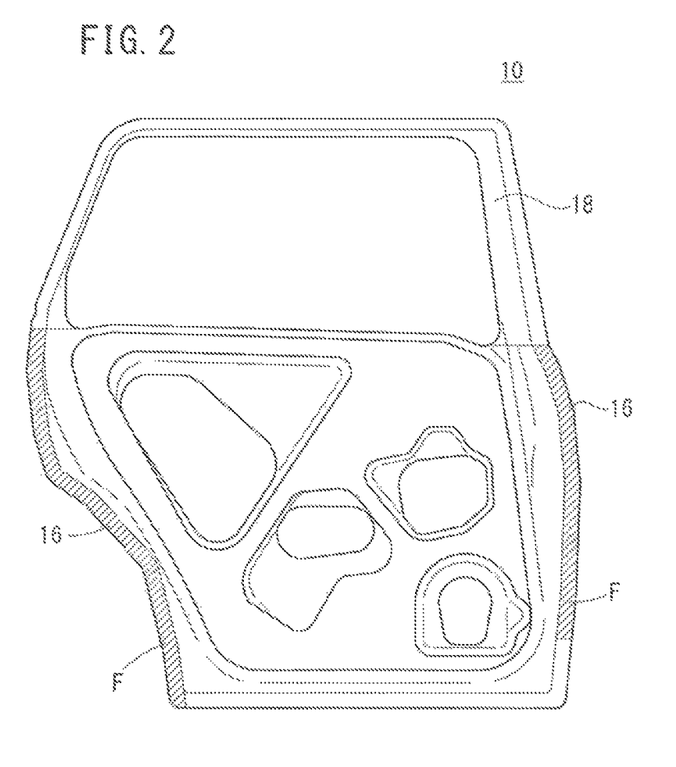
FIG. 2 is an elevational view as seen from the direction indicated by the arrow A in FIG. 1.
Figure 3:
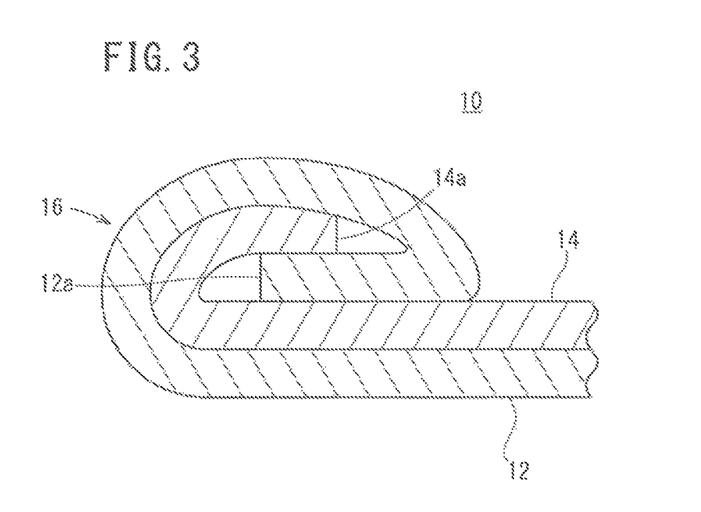
FIG. 3 is a cross-sectional view of the panel assembly taken along line III-III of FIG. 1.

The edges 16 extend three-dimensionally within the ranges of the automobile rear door, which are represented by the cross-hatched strips F shown in FIG. 2. Alternatively, the edges 16 may extend three-dimensionally fully around the automobile rear door.

As shown in FIGS. 1 and 3 through 5, the outer panel 12 and the inner panel 14 are seamed at each of the edges 16, in a state in which the outer panel 12 has a distal end portion 12a contained within the inner panel 14, and the inner panel 14 has a distal end portion 14a contained within the distal end portion 12a of the outer panel 12.

Figure 4:
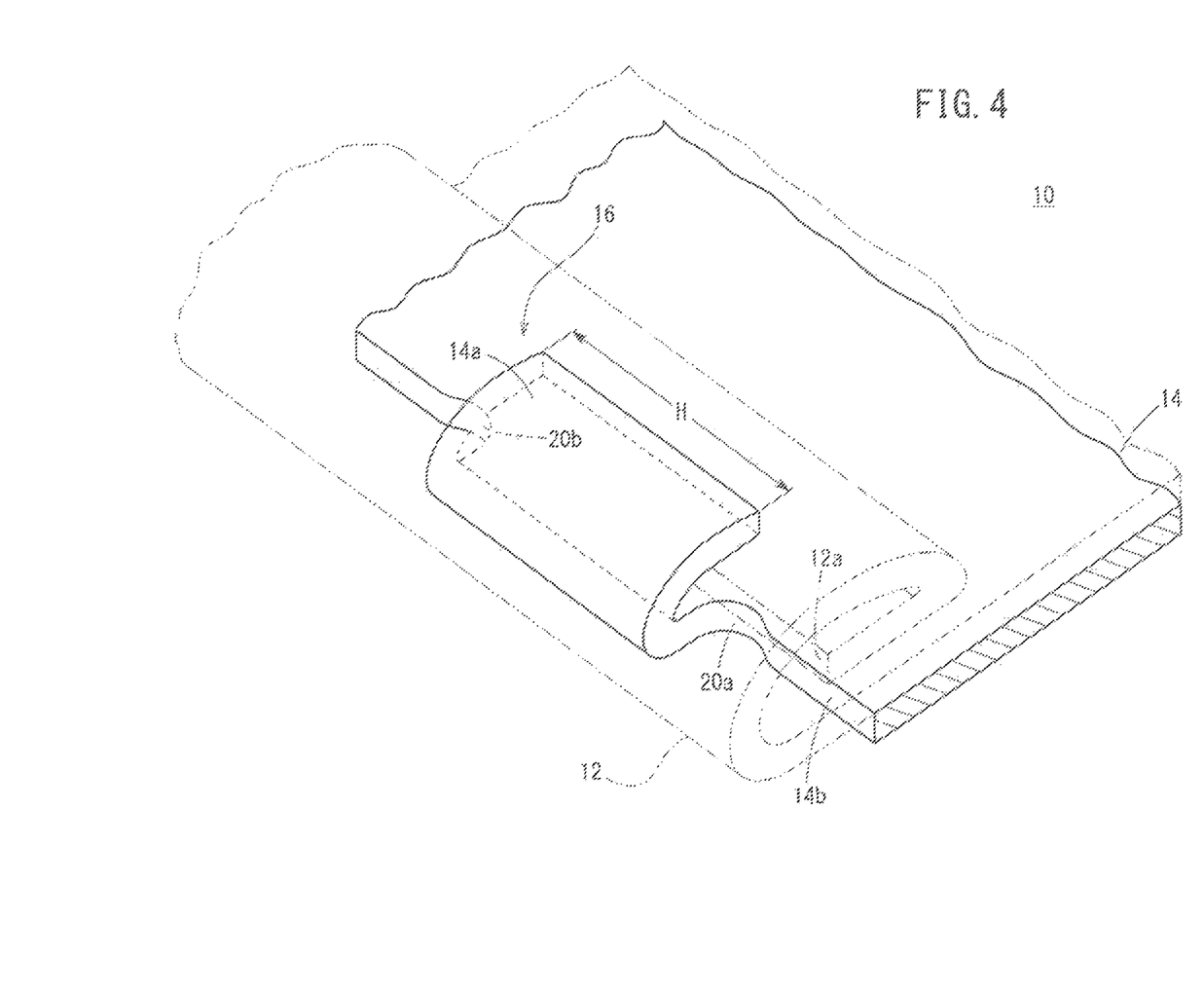
FIG. 4 is a perspective view of a principal part of the panel assembly.
Figure 5:
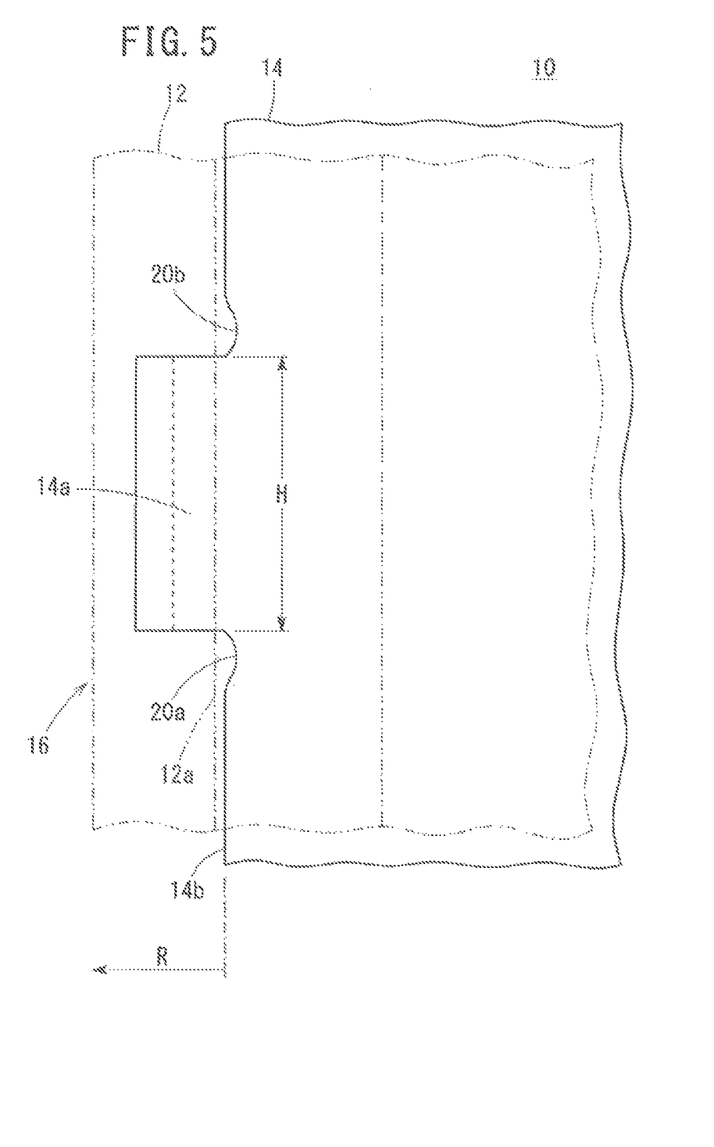
FIG. 5 is a plan view of a principal part of the panel assembly.

As shown in FIGS. 4 and 5, the distal end portion 14a of the inner panel 14 projects from an end 14b thereof. The distal end portion 14a is of a rectangular shape having a predetermined forming width H. Among areas of the inner panel 14, the distal end portion 14a thereof is an area to be seamed, whereas the end 14b thereof is an area that is not seamed.

According to the present embodiment, boundary regions between the distal end portion 14a and the end 14b have respective clearances 20a, 20b, which are defined in the end 14b, and are spaced away from a seaming range (refer to the forming range R shown in FIG. 5). The clearances 20a, 20b are defined as arcuately curved recesses in the end 14b. The clearances 20a, 20b may be formed integrally in the end 14b when the inner panel 14 is pressed to shape.

A method of forming the panel assembly 10 will be described below.

Figure 6:
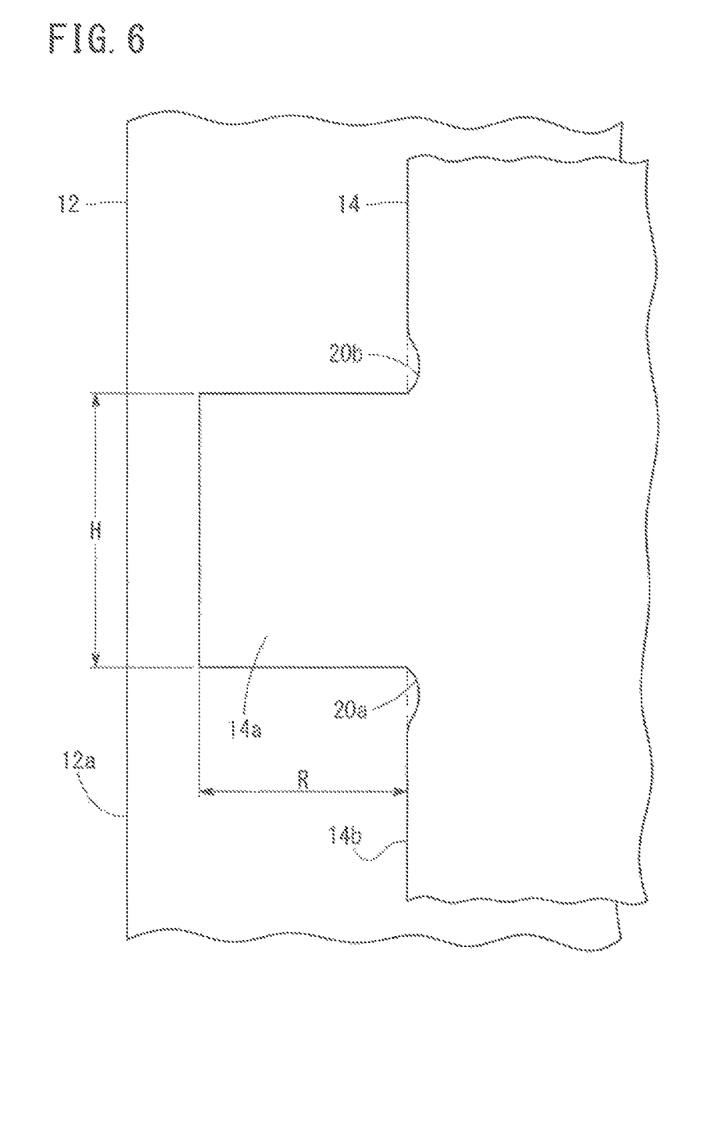
FIG. 6 is a plan view of an outer panel and an inner panel, which overlap each other, of the panel assembly.

As shown in FIG. 6, the outer panel 12 and the inner panel 14 are placed in overlapping relation to each other. At this time, the distal end portion 12a of the outer panel 12 projects a predetermined length outwardly more than the distal end portion 14a of the inner panel 14.

Figure 7:
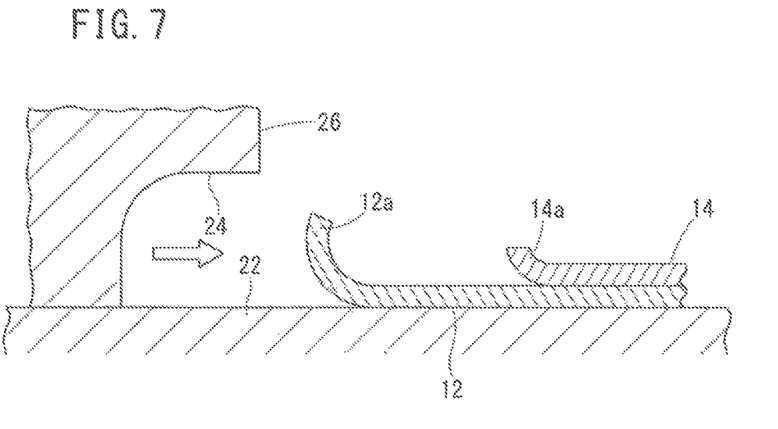
FIG. 7 is a fragmentary cross-sectional view showing the outer panel and the inner panel, which are to be curled.

Next, as shown in FIG. 7, the outer panel 12 and the inner panel 14, which overlap each other, are placed on a curling block 22. The distal end portion 12a of the outer panel 12 and the distal end portion 14a of the inner panel 14 are bent arcuately beforehand, thereby providing flanges. The outer panel 12 and the inner panel 14 are held under pressure on the curling block 22 by a non-illustrated pressing pad.

A curling punch (curling die) 26, which has a curling surface 24 in the form of a curved surface, is slidably placed on the curling block 22. Thereafter, the curling punch 26 is moved in the direction of the arrow in FIG. 7 (forming direction) on the curling block 22, so as to cause the curling surface 24 to start curling the distal end portion 12a of the outer panel 12.

Figure 8:
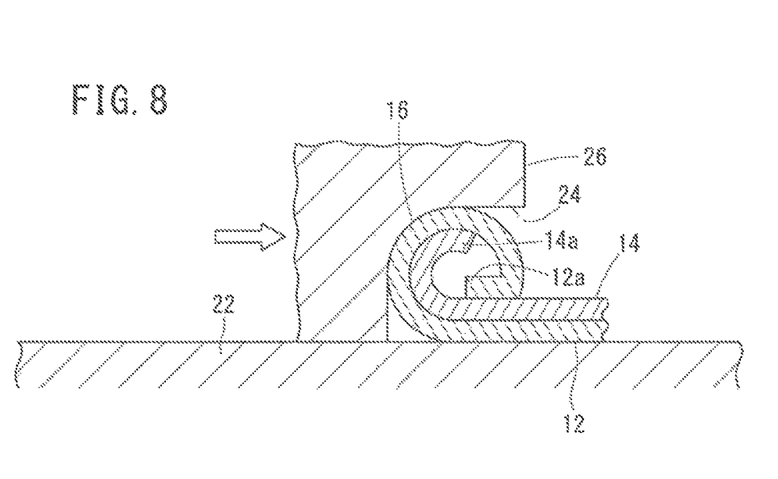
FIG. 8 is a fragmentary cross-sectional view showing the outer panel and the inner panel as they are being curled.

As the curling punch 26 moves further in the direction of the arrow, the distal end portion 14a of the inner panel 14 becomes entangled therein and starts to be curled by the distal end portion 12a of the outer panel 12, which is being curled progressively by the curling punch 26. When the distal end portion 14a is curled through the forming range, as shown in FIG. 8, the distal end portions 12a, 14a are seamed into an edge 16, which has a substantially circular cross-sectional shape. The edge 16, which is formed in the foregoing manner, is made up of a maximum of five vertically stacked panel layers. However, the edge 16 may be made up of a maximum of four vertically stacked panel layers.

Figure 9:
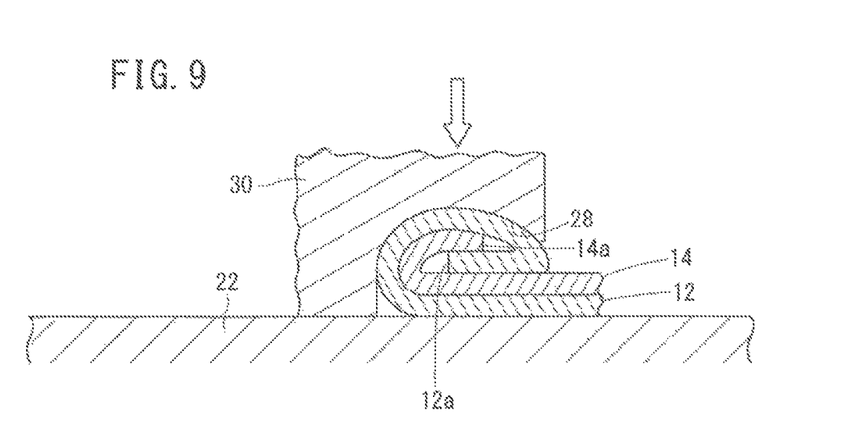
FIG. 9 is a fragmentary cross-sectional view showing the outer panel and the inner panel as they are being seamed.

Thereafter, as shown in FIG. 9, the curling punch 26 is removed, and a seaming punch 30 having a seaming surface 28 is applied to the edge 16 on the curling block 22. More specifically, the seaming punch 30 is moved downwardly in the direction of the arrow in FIG. 9, thereby deforming the edge 16 into a flat shape, and seaming the curled distal end portions 12a, 14a together. At this time, the edge 16 has the cross-sectional shape shown in FIG. 3.

According to the present embodiment, as shown in FIGS. 4 through 6, the boundary regions of the inner panel 14 between the distal end portion 14a and the end 14b have the respective clearances 20a, 20b, which are defined in the end 14b and are spaced away from the seaming range. Therefore, the forming width H of the distal end portion 14a, which is seamed, is kept constant, or the forming width H is prevented from increasing at the boundary regions.

When the curling punch 26 curls the distal end portion 12a of the outer panel 12, thereby causing the distal end portion 12a to include and curl the distal end portion 14a of the inner panel 14, the resistance that the curling punch 26 is subjected to during the curling action is not increased. Consequently, with a simple structure and process, the load imposed on the curling punch 26 when the curling punch curls the inner panel 14 can effectively be reduced.

Since the load imposed on the curling punch 26 when the curling punch seams the distal end portions 12a, 14a can also be reduced, the seamed edges 16 are shaped smoothly without irregularities such as convexities and concavities. Thus, the edges 16 are prevented from being subject to improper biting engagement with the curling punch 26, and the edges 16 have a neat appearance.

The panel assembly and the method of forming the panel assembly according to the present invention may also be applied to various other products apart from automobile components.

With the method of forming the panel assembly according to the present invention, the distal end portion 12a of the outer panel 12 and the distal end portion 14a of the inner panel 14 are curled to form the edges 16, each of which has a substantially circular cross-sectional shape. Among the curled edges 16, only portions thereof that lie outside of the ends of the outer panel 12 may be deformed into a flat shape by seaming.

Although a preferred embodiment of the present invention has been described in detail above, it should be noted that various changes and modifications may be made to the embodiment without departing from the scope of the invention as set forth in the appended claims.

What is claimed is:

1. A panel assembly comprising:
    an outer member and an inner member, which overlap each other and jointly have an edge that includes a distal end portion of the outer member and a distal end portion projecting with a constant width from an end of the inner member extending substantially straight, the distal end portions being fastened together by sheet metal seaming,
    wherein boundary regions of the inner member between the distal end portion, which is seamed, and the end, which is not seamed, have respective clearances defined in the end of the inner member as cut-outs recessed in a forming direction, and which are spaced away from a seaming range in which the distal end portions are seamed.

2. The panel assembly according to claim 1, wherein the clearances are defined as arcuately curved recesses in the end.

3. A method of forming a panel assembly having an outer member and an inner member, which overlap each other and jointly have an edge that includes a distal end portion of the outer member and a distal end portion projecting with a constant width from an end of the inner member extending substantially straight, the distal end portions being fastened together by sheet metal seaming, the method comprising the steps of:
    forming, in boundary regions of the inner member between the distal end portion, which is seamed, and the end, which is not seamed, respective clearances defined in the end of the inner member as cut-outs recessed in a forming direction, and which are spaced away from a seaming range in which the distal end portions are seamed;
    placing the inner member and the outer member in overlapping relation to each other while the distal end portion of the inner member is spaced inwardly from the distal end portion of the outer member; and
    curling the distal end portion of the outer member and the distal end portion of the inner member, and fastening the distal end portion of the outer member and the distal end portion of the inner member together to form the edge by way of sheet metal seaming.

4. The method according to claim 3, wherein the clearances are defined as arcuately curved recesses in the end.

* * * * *